US005952905A

United States Patent [19]

Kim et al.

[11] Patent Number: 5,952,905

[45] Date of Patent: *Sep. 14, 1999

[54] COIL SEPARATOR FOR DEFLECTION YOKE

[75] Inventors: Nam Soo Kim, Suwon; Sam Gyu Hwang, Kyunggi-do, both of Rep. of Korea

[73] Assignee: Samsung Electro-Mechanics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,469

[22] Filed: Oct. 18, 1996

[30] Foreign Application Priority Data

Jul. 31, 1996 [KR] Rep. of Korea ...................... 96-32561

[51] Int. Cl.[6] ............................. H01H 1/00; H01H 5/00; H04N 5/655

[52] U.S. Cl. .......................... 335/213; 335/210; 313/440; 348/831

[58] Field of Search .................................... 335/210–214; 313/440; 348/828–831

[56] References Cited

U.S. PATENT DOCUMENTS

| | | | |
|---|---|---|---|
| 3,302,050 | 1/1967 | Obert et al. | 335/210 |
| 3,582,848 | 6/1971 | Ryder | 335/212 |
| 3,786,185 | 1/1974 | Shrader | 178/7.8 |
| 3,810,053 | 5/1974 | Mcglashan | 335/212 |
| 3,921,110 | 11/1975 | Ishii et al. | 335/210 |
| 4,712,080 | 12/1987 | Katou | 335/213 |
| 5,838,098 | 11/1998 | Takagishi | 313/440 |

*Primary Examiner*—Michael L. Gellner
*Assistant Examiner*—Raymond Barrera
*Attorney, Agent, or Firm*—Ladas & Parry

[57] ABSTRACT

A coil separator for a deflection yoke capable of simplifying its manufacturing process by assembling accessory components on divided neck portions and screen portions and then connecting the neck portions to the screen portions. The coil separator includes a screen portion having a band portion formed on its conical lower end, a neck portion including a wire guiding portion and a yoke clamp fastening portion, and a connecting portion for connecting the neck portion to the screen portion. The connecting portion may include a plurality of projected pins and insertion holes formed on the neck portion and the screen portion, respectively, so that the projected pins fit into the insertion holes to connect the neck portion to the screen portion. As an alternative, the connecting portion may include a spacer which has a predetermined height and is inserted between the neck portion and the screen portion to adjust the length of the screen portion.

13 Claims, 6 Drawing Sheets

COIL SEPARATOR FOR DEFLECTION YOKE

BACKGROUND OF THE INVENTION

1. Field of the Invention

The present invention relates to a coil separator for a deflection yoke for a cathode ray tube. In particular, the present invention relates to a winding frame type coil separator for a deflection yoke wherein upper neck portions, which contain left and right screen portions and wire guiding portions, are separately formed, and then connected together after accessory parts and components are assembled thereon.

2. Description of the Prior Art

Generally, a coil separator of a deflection coil can be classified into a winding frame type and a bobbin type. The winding frame type coil separator is shown in FIGS. 1 and 2. Referring to FIGS. 1 and 2, vertical and horizontal coils c are pre-wound in a specific shape by a separate coil winding machine, and then are assembled on a coil separator a. According to this winding frame type coil separator, a screen portion a1 and a neck portion a4 composed of a wire guiding portion a2 and a yoke clamp fastening portion a3 can be formed as a one-piece body.

A bobbin type coil separator is shown in FIG. 3. Referring to FIG. 3, a plurality of coil guides b2 for guiding coils c are formed inside the screen portion b1, and upper and lower regions of the screen portion b1, respectively, and the vertical and horizontal coils are wound along the coil guides b2. According to the bobbin type coil separator b, the coil guide b2 and the yoke clamp fastening portion b3, which constitute the neck portion, cannot be formed as a one-piece body. Thus, a rear cover b4 is separately prepared, and then the neck portion is secured to the screen portion b1 by a latching projection b5 of the rear cover b4.

In the bobbin type coil separator as shown in FIG. 3, since a portion of the wound coil extends to the upper region of the screen portion b1, i.e., to the neck portion b6, special devices for injection molding and for winding the coil are required and its manufacturing processes are complicated, thereby deteriorating its workability and productivity.

In the winding frame type coil separator, since the vertical and horizontal coils are pre-wound by a separate device and then connected together, its manufacturing processes and its productivity can be greatly improved in comparison to the bobbin type coil separator.

However, according to the winding frame type coil separator, various components are attached to the neck portion and the wound coils are assembled on the screen portion. Specifically, in manufacturing the neck portion, a comma-free assembly and a T.B.H assembly including resistors and variable resistors are assembled on a printed circuit board, wires for various components are first cut, and then comma-free wiring is performed. Thereafter, a secondary cutting and a first soldering operation are performed after a V.L.M.F. coil assembly is assembled, a convergence yoke is assembled, and then a second soldering operation is performed. As a result, a number of simple processes are required in manufacturing the neck portion. Such processes require much working time, and cannot be simultaneously performed with the assembling of the wound coil on the screen section, resulting in a deterioration of productivity.

SUMMARY OF THE INVENTION

The present invention has been made to solve the problems involved in the prior art. Therefore, it is an object of the present invention to provide a coil separator for a deflection yoke whose manufacturing can be effective and simplified by assembling accessory components on divided upper neck portions and then connecting the neck portions to right and left screen portions.

It is another object of the present invention to provide a coil separator for a deflection yoke in which the length of the deflection yoke can be varied by employing a separate spacer between the screen portions and the neck portions.

In order to achieve the above objects, there is provided a coil separator for a deflection yoke, comprising:

a screen portion having a band portion formed on a conical lower end of the screen portion;

a neck portion including a wire guiding portion and a yoke clamp fastening portion; and means for connecting the neck portion to the screen portion, the connecting means comprising a plurality of pins projected from the wire guiding portion and a plurality of insertion holes formed on the screen portion to receive the pins therein, respectively.

Preferably, the connecting means further comprises a spacer inserted between the neck portion and the screen portion to vary the length of the screen portion.

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE PREFERRED EMBODIMENTS

Figure 2:
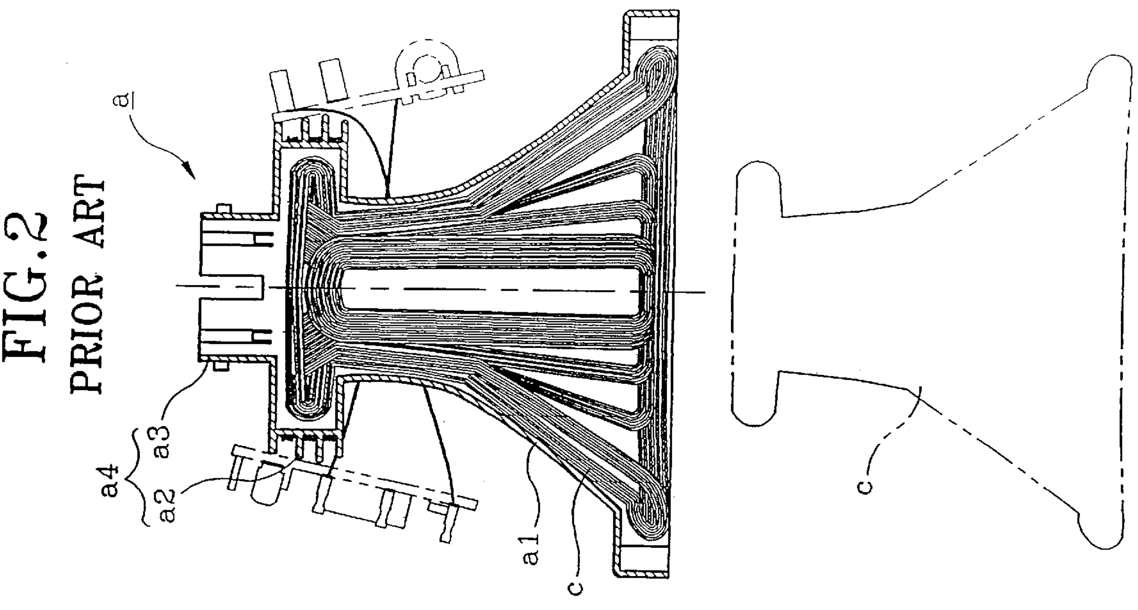
FIG. 2 PRIOR ART
FIG. 2 is a sectional view of a conventional winding framed type deflection yoke in an assembled state.
Figure 1:
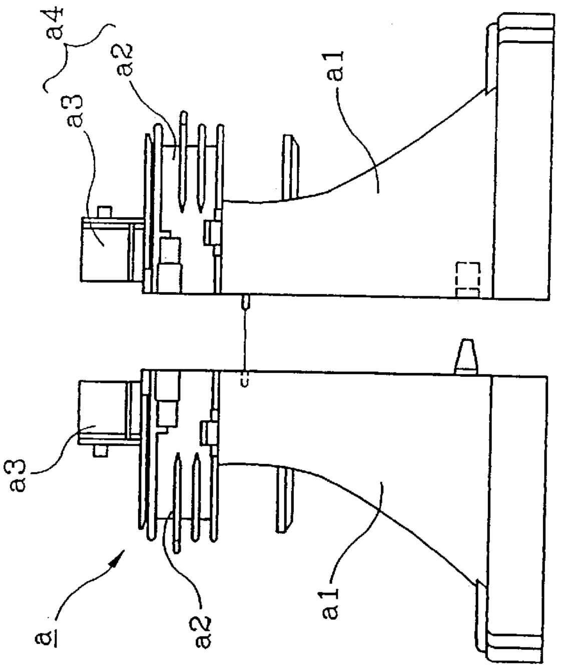
FIG. 1 PRIOR ART
FIG. 1 is a front view illustrating a conventional winding frame type coil separator.
Figure 3:
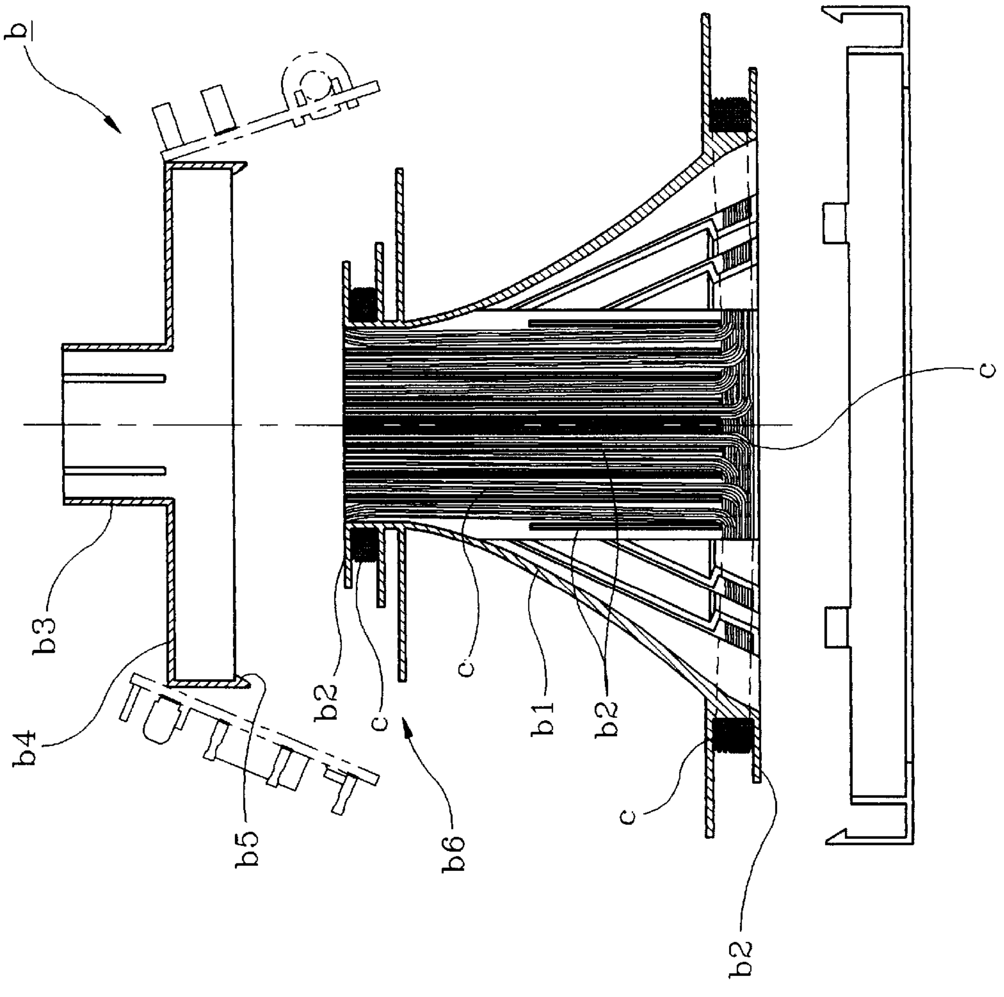
FIG. 3 PRIOR ART
FIG. 3 is a sectional view illustrating a conventional bobbin type coil separator.
Figure 4:
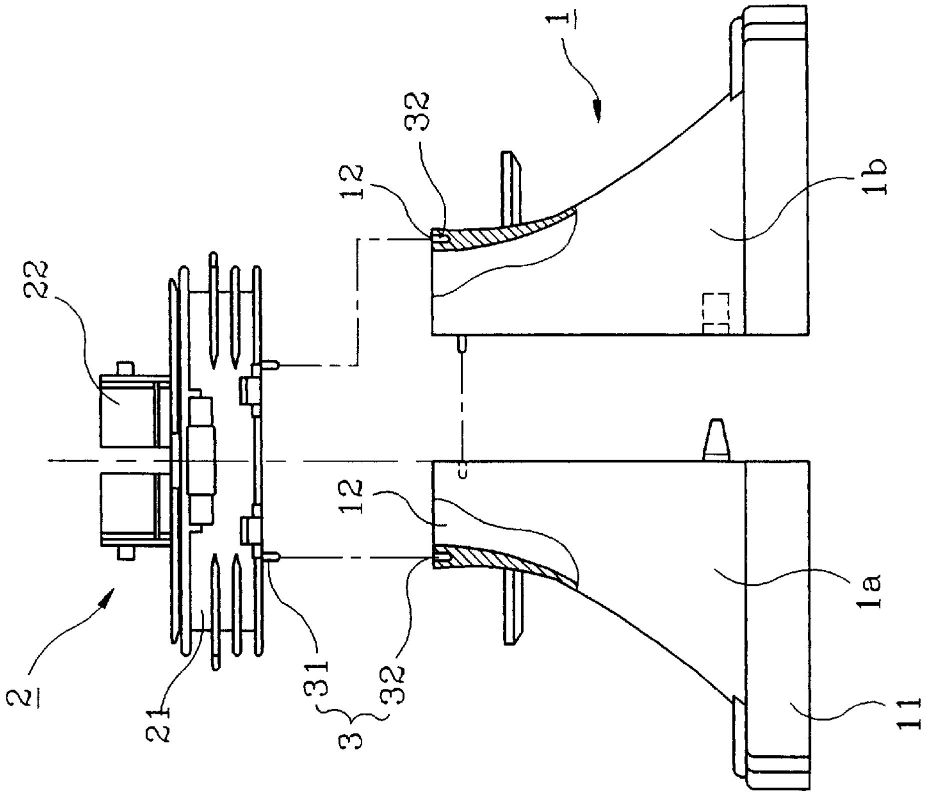
FIG. 4 is an exploded front view illustrating the coil separator according to one embodiment of the present invention.

FIG. 4 is an exploded front view of the coil separator according to an embodiment of the present invention. Referring to FIG. 4, the coil separator includes a screen portion 1 which is divided into left and right screen portions 1*a* and 1*b*, and a neck portion 2. A band portion 11 is provided under the screen portion 1. The neck portion 2 is composed of a wire guiding portion 21 and a yoke clamp fastening portion 22.

According to the present invention, the screen portion 1 and the neck portion 2 are separately prepared, and then connected together in such a manner that the upper end of the screen portion 1 borders on the wire guiding portion 21 of the neck portion 2. A connecting means 3 is used for connecting the neck portion 2 to the screen portion 1. The connecting means 3, as shown in FIG. 4, may comprise a plurality of pins 31 projected from the wire guiding portion 21, and a plurality of insertion holes 32 formed on the screen portion 1 to receive the pins 31, respectively. On the contrary, the connecting means 3 may comprise a plurality of pins 31 projected from the upper end 12 of the screen portion 1, and a plurality of insertion holes 32 formed on the wire guiding portion 21.

Figure 6:
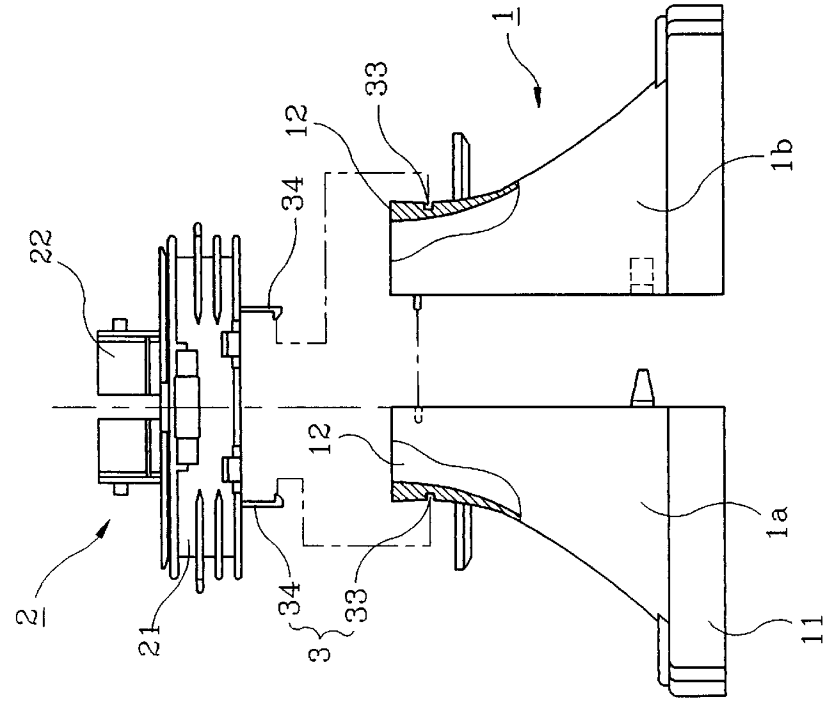
FIG. 6 is an exploded front view illustrating the coil separator according to another embodiment of the present invention.
Figure 5:
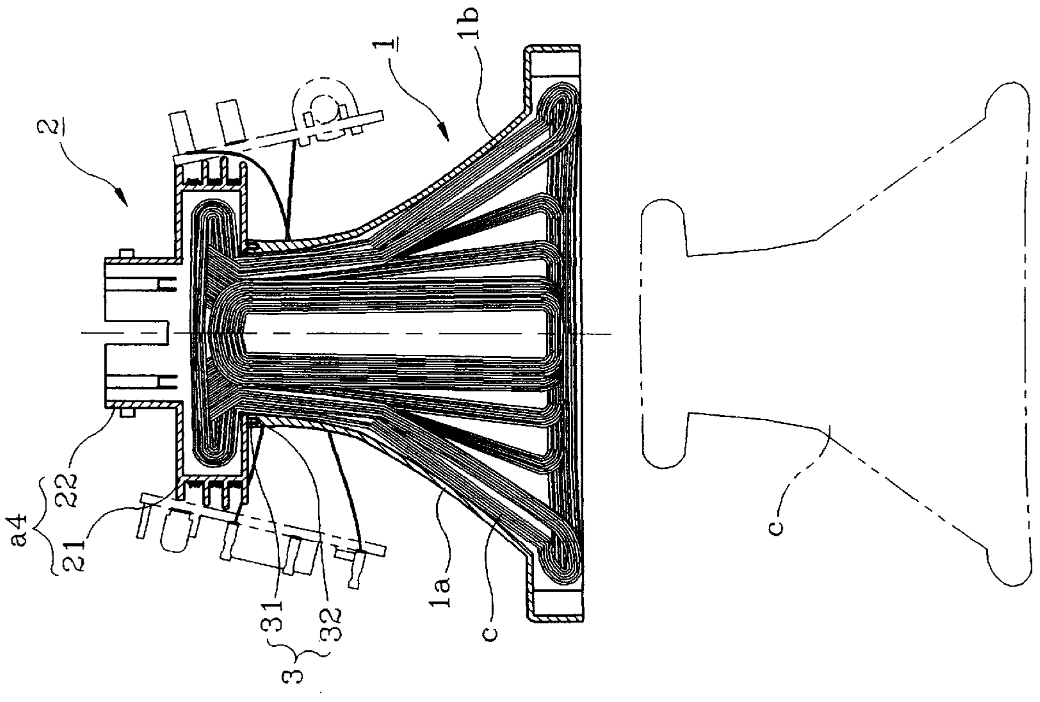
FIG. 5 is a sectional view illustrating the coil separator in an assembled state according one embodiment of the present invention.

Further, as shown in FIG. 6, the connecting means 3 may comprise a plurality of latching projections 34 formed on the wire guiding portion 21, and a plurality of recesses 33 formed on the upper end of the screen portion 1 to receive and to be interlocked with the latching projections 34, respectively.

Figure 8:
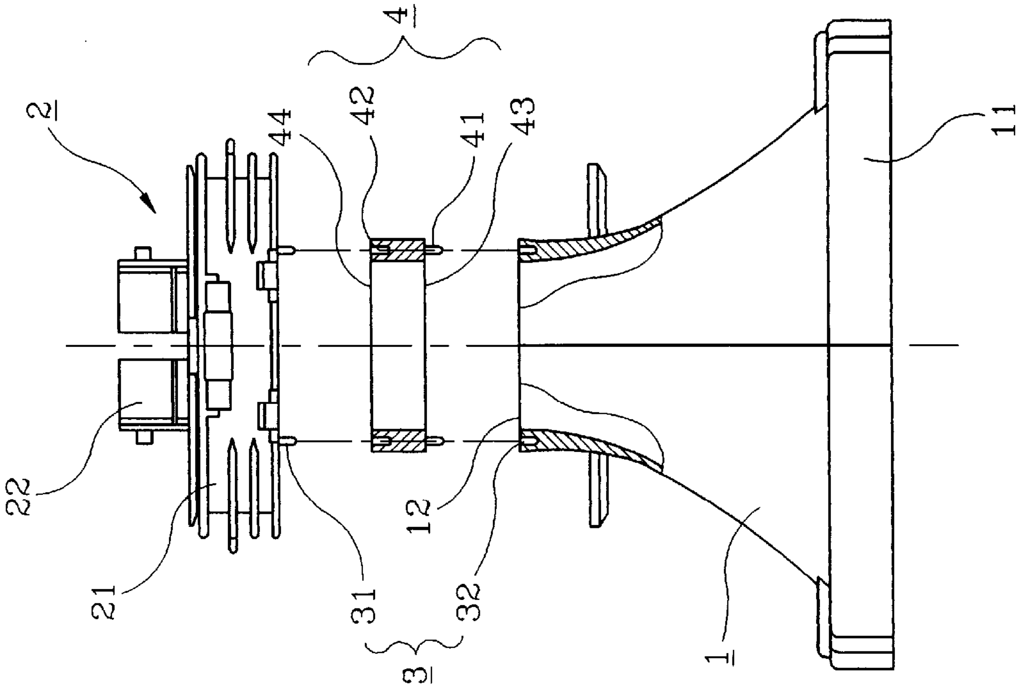
FIG. 8 is an exploded front view illustrating the coil separator according to still another embodiment of the present invention.

In the embodiment of FIG. 8, the coil separator includes a spacer 4 for varying the length of the coil separator.

Figure 9:
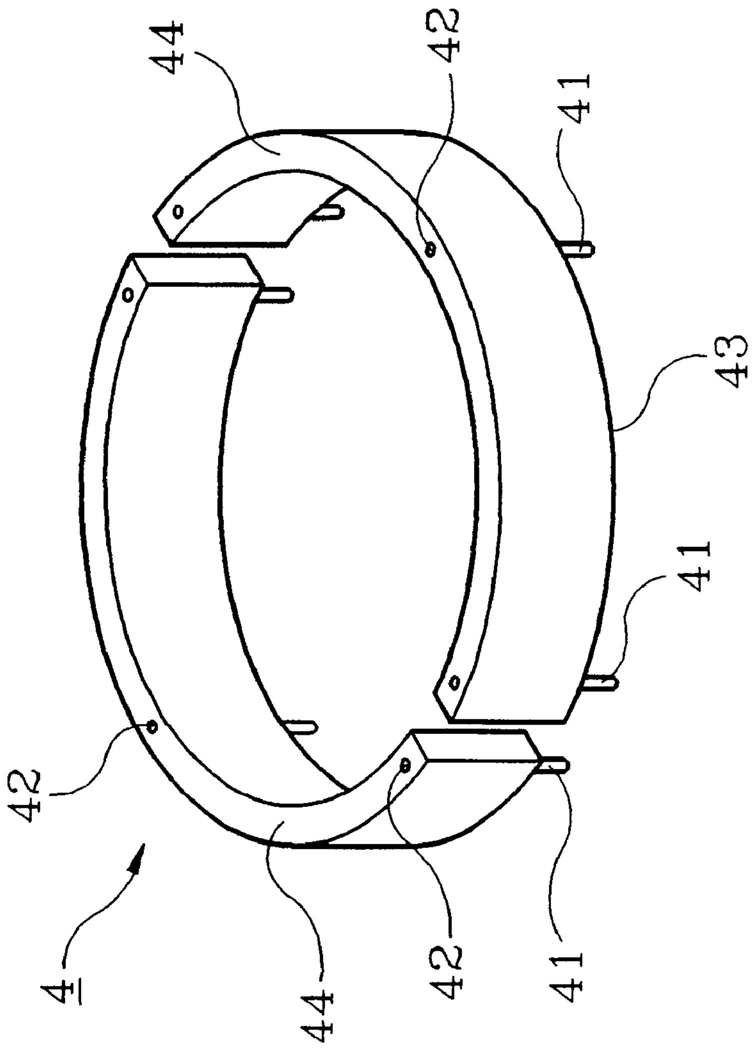
FIG. 9 is a perspective view of a spacer according to still another embodiment of the present invention.

Referring to FIG. 9, the spacer 4 has the shape of a ring, which may be divided into two halves or formed as a single body. The spacer 4 has a plurality of projected pins 41 and insertion holes 42 formed on lower and upper end portions 43 and 44 thereof, respectively.

Practically, the height of the spacer 4 is in the range of about 0.5–3 mm so as to adjust the characteristics of the coil separator.

The operation and working effect of the present invention as constructed above will now be explained.

Referring again to FIG. 4, the screen portion 1 and the neck portion 2 are separately formed and then assembled through different injection molding and assembling processes.

For instance, the screen portion 1 is divided into the left and right halves 1*a* and 1*b*, and the coils c wound in a specific shape, e.g. a saddle shape, by a separate coil winding machine (not illustrated) are assembled inside the left and right halves 1*a* and 1*b* of the screen portion 1.

The neck portion 2 is prepared by assembling the comma-free assembly and the T.B.H assembly of resistors and variable resistors on the printed circuit board, cutting the wires of the assembled components, performing comma-free wiring, assembling the V.L.M.F coil assembly, cutting the wires of the assembled components, and soldering the wires.

Figure 7:
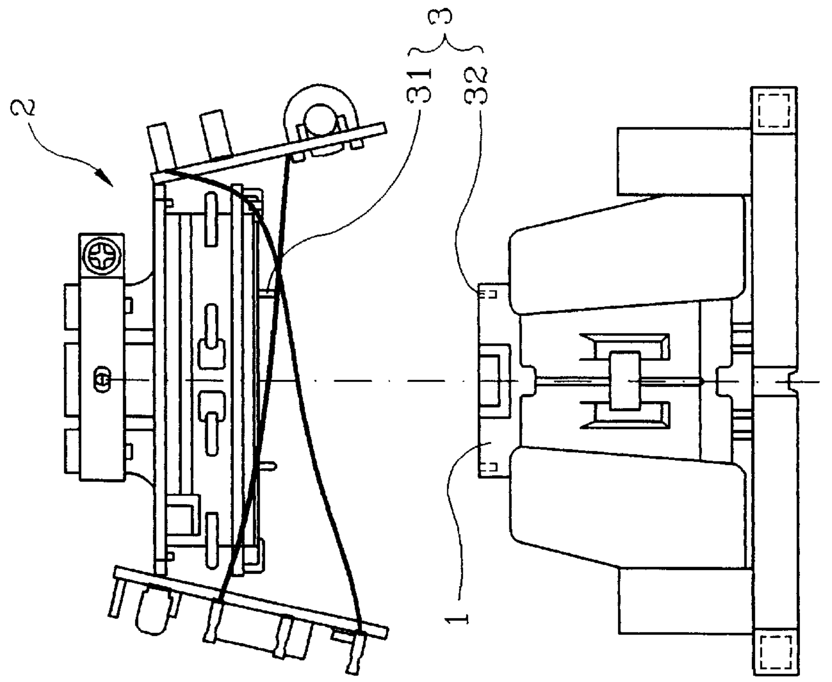
FIG. 7 is a front view illustrating the deflection yoke in an assembled state according to one embodiment of the present invention.

Referring to FIG. 7, the screen portion 1 and the neck portion 2 are then assembled together by means of the connecting means 3 as described above to complete the assembling of the deflection yoke.

Meanwhile, the spacer 4 is inserted between the neck portion 2 and the screen portion 1 in order to adjust the length of the screen portion for the improvement of the sensitivity of the deflection yoke.

At this time, as shown in FIG. 8, the projected pins 31 of the wire guiding portion 21 are inserted into the insertion holes 42 formed on the upper end portion 44 of the spacer 4, while the projected pins 41 of the spacer 4 are inserted into the insertion holes 32 formed on the end portion 12 of the screen portion 1, so that the length of the coil separator extends as long as the height of the spacer 4.

As described above, according to the present invention, the coil separator is completed by separately preparing the neck portion 2 including the wire guiding portion 21 and the yoke clamp fastening portion 22, and the screen portion 1 having the band portion 11 provided under the screen portion 1, assembling necessary components thereon, respectively, and then connecting the neck portion 2 to the screen portion 1. Thus, a simultaneous assembling of the two portions in different working places can be possible without the unnecessary movement of the associated components, and an automatic assembling work for an unmanned production can be achieved, resulting in the reduction of inferior products and the improvement of the productivity. Further, the optimum deflection sensitivity can be obtained by adjusting the length of the screen portion 1 by means of the spacer 4 inserted to the upper portion of the screen portion 1.

While the present invention has been described and illustrated herein with reference to the preferred embodiments thereof, it will be understood by those skilled in the art that various changes in form and details may be made therein without departing from the spirit and scope of the invention.

What is claimed is:

1. A deflection yoke for a cathode ray tube, comprising:

a pre-formed deflection coil assembly wound by a coil winding machine in the shape of a saddle for deflection of an electron beam in horizontal and vertical directions; said coil assembly including a pair of horizontal deflection coils spaced vertically by vertical coils, said horizontal coils being wound annularly at upper and lower ends of said vertical coils, and a coil separator surrounding an outer periphery of said pre-formed coil assembly;

said coil separator including:

a screen portion of conical shape having a lower end with a band at said lower end, said screen portion coaxially surrounding an axis of said deflection coil assembly such that said screen portion surrounds said vertical coils of the deflection coil assembly in a position in which said band surrounds the horizontal deflection coil at the lower end of the coil assembly while the horizontal deflection coil at the upper end of the coil assembly extends above said screen portion, a neck portion prepared separately from said screen portion, said neck portion including a wire guiding portion and a yoke clamp fastening portion, and means for coaxially connecting said neck portion to an upper end of said screen portion such that said wire guiding portion surrounds said horizontal deflection coil of said deflection coil assembly which extends above the screen portion, said coil separator comprising left and right portions which are fitted on and assembled around said deflection coil assembly such that the horizontal deflection coil at the upper end of the deflection coil assembly extends above the screen portion.

2. A deflection yoke as claimed in claim 1, wherein said means connecting said neck portion to said screen portion includes a pin and hole connection.

3. A deflection yoke as claimed in claim 1, wherein said means connecting said neck portion to said screen portion includes a spacer having a predetermined height to provide said deflection yoke with a maximum degree of sensitivity.

4. A deflection yoke as claimed in claim 3, wherein said spacer has opposite ends, said means connecting said neck portion to said screen portion further includes a plurality of axially projecting pins at one end of said spacer and a plurality of insertion holes at the other end of said spacer, said neck portion and screen portion having respective axially projecting pins and holes to engage the holes and receive the pins at the ends of the spacer.

5. A deflection yoke as claimed in claim 4, wherein said spacer has the shape of a ring whose diameter is equal to that of the upper end of said screen portion.

6. A deflection yoke as claimed in claim 1, wherein said means connecting said neck portion to said screen portion includes connection elements which connect to said left and right screen portions.

7. A deflection yoke as claimed in claim 1, wherein said wire guiding portion and said yoke clamp fastening portion of said neck portion are formed as an integral one-piece body.

8. A deflection yoke as claimed in claim 1, wherein said connecting means comprises a plurality of projecting pins and insertion holes formed on said neck portion and said screen portion, respectively, wherein said projecting pins fit into said insertion holes to connect said neck portion to said screen portion.

9. A deflection yoke as claimed in claim 1, wherein said connecting means comprises a plurality of recesses formed on an upper periphery of said screen portion and a plurality of latching projections formed on said wire guiding portion, wherein said latching projections are received in and are interlocked with said recesses to connect said neck portion to said screen portion.

10. A deflection yoke as claimed in claim 1, wherein said right and left screen portions are joined along surfaces extending axially of said deflection coils.

11. A deflection yoke as claimed in claim 1, wherein said upper end of said screen portion is at the end of minimum diameter of said conical shape of the screen portion, said connecting means directly engaging said upper end of said screen portion.

12. A deflection yoke as claimed in claim 11, wherein said screen portion has the shape of a ring at said upper end, said connecting means including openings in said ring at said upper end of said screen portion, and engaging members on said neck portion engageable in said openings in said ring.

13. A deflection yoke as claimed in claim 12, wherein said openings in said ring are formed as axial holes in an end face of said ring said holes being distributed around said ring.

* * * * *